(12) United States Patent
Maerky et al.

(10) Patent No.: US 7,511,475 B2
(45) Date of Patent: Mar. 31, 2009

(54) MOBILE MEMBER SPEED SENSOR

(75) Inventors: Christophe Maerky, Saint-Ouen L'Aumone (FR); Geraint Jewell, Owlthorpe Sheffield (GB); Richard Clark, Sheffield (GB); Paul Stewart, Sheffield (GB)

(73) Assignee: Valeo Systemes de Controle Moteur, Osny (FR)

( * ) Notice: Subject to any disclaimer, the term of this patent is extended or adjusted under 35 U.S.C. 154(b) by 225 days.

(21) Appl. No.: 10/537,267

(22) PCT Filed: Dec. 1, 2003

(86) PCT No.: PCT/FR03/03541

§ 371 (c)(1),
(2), (4) Date: Apr. 14, 2006

(87) PCT Pub. No.: WO2004/053502

PCT Pub. Date: Jun. 24, 2004

(65) Prior Publication Data

US 2006/0208842 A1     Sep. 21, 2006

(30) Foreign Application Priority Data

Dec. 2, 2002   (FR)  ................................. 02 15130

(51) Int. Cl.
*G01B 7/14* (2006.01)
(52) U.S. Cl. ........................ 324/207.15; 324/207.22; 324/207.24; 123/90.11
(58) Field of Classification Search ............ 324/207.11, 324/207.15–207.18, 207.22, 207.24; 123/90.11
See application file for complete search history.

(56) References Cited

U.S. PATENT DOCUMENTS

| 3,094,635 A | | 6/1963 | Wysocki |
| 4,779,582 A | * | 10/1988 | Lequesne ................. 123/90.11 |
| 6,469,500 B1 | * | 10/2002 | Schmitz et al. ........ 324/207.16 |

FOREIGN PATENT DOCUMENTS

| FR | 2 812 683 | 2/2002 |
| JP | 3176217 | 7/1991 |
| WO | WO-00/65204 A1 | 11/2000 |
| WO | WO-01/95348 A1 | 12/2001 |

\* cited by examiner

*Primary Examiner*—Ramon M Barrera
(74) *Attorney, Agent, or Firm*—Muncy, Geissler, Olds & Lowe, PLLC

(57) ABSTRACT

A speed sensor for a moving member (8) comprises means (27; 34) for constituting a magnetic singularity on a portion of the moving member, and a sleeve slidably receiving said portion and including at least an annular coil (20, 21) and an annular permanent magnet (22, 23) disposed on a common axis between annular pole pieces (24, 25).

3 Claims, 2 Drawing Sheets

MOBILE MEMBER SPEED SENSOR

The present invention relates to a speed sensor for a moving member, which sensor is suitable in particular for use in engine valves for measuring the travel speed of the valves and/or of moving members for actuating said valves, more particularly for valves that are actuated by electromagnetic means.

BACKGROUND OF THE INVENTION

Electromagnetic valve actuators are known that comprise electromagnetic means for moving a moving member comprising an armature secured to a rod connected to the stem of the valve, which moving member is moved between a position in which the valve is closed and a position in which the valve is open. The electromagnetic means are controlled via a servo-control system operating in particular as a function of the position of the moving member and taking the speed of the moving member into account. The speed of the moving member is obtained by digitally differentiating its position as supplied by a position sensor such as a Hall effect sensor. Sensors of that type operate by means of permanent magnets secured to the stem. Nevertheless, it is very difficult to put such magnets into place. The complexity of the sensors also limits their reliability. In addition, such position sensors include active elements that need to be electrically powered in order to operate.

OBJECT OF THE INVENTION

An object of the invention is to provide means for evaluating the speed of a moving member, which means are simple, reliable, and consume little electric energy.

BRIEF SUMMARY OF THE INVENTION

To this end, the invention provides a speed sensor for a moving member, the sensor comprising means for constituting a magnetic singularity on a portion of the moving member, and a sleeve slidably receiving said portion and including at least an annular coil and an annular permanent magnet disposed on a common axis between annular pole pieces.

The term "magnetic singularity" is used to mean a local modification in a magnetic characteristic of the moving member. The magnetic flux supplied by the permanent magnet depends directly on the position of the magnetic singularity relative to the magnet, such that movement of said magnetic singularity in the sleeve causes the magnetic field produced by the permanent magnet to vary. Variation in the magnetic flux induces a voltage in the coil that is substantially proportional to the travel speed of the magnetic singularity in the sleeve. Thus, the sensor of the invention is relatively simple in structure and does not require any electrical power supply.

Furthermore, the digital differentiation implemented on the basis of the position signal provided by the Hall effect sensor in the prior art is generally performed by taking the difference between two positions measured at given instants, and then in dividing the difference by the time interval between the two position measurements. Unfortunately, the duration of the time interval is generally very small, so that dividing by said time interval amplifies any errors in the measurement of the position, thereby leading to significant fluctuation in the speed as calculated. This makes the calculated speed difficult to exploit, and requires a large amount of processing to be used that is relatively complex and expensive.

Preferably, the magnetic singularity, the coil, and the permanent magnet are arranged so that the coil provides a linear signal that is independent of the position of the moving member.

In other words, the magnetic singularity, the permanent magnet, and the coil are arranged so that the rate of magnetic flux variation as a function of the speed of the moving member is substantially constant regardless of the position of the moving member (i.e. over the entire working stroke thereof) and for the coil to deliver information, specifically voltage, that is proportional to the rate at which the magnetic flux is varying (and thus to the speed of the moving member) at a ratio that is substantially constant over the entire working stroke of the moving member. The processing that than needs to be performed in order to obtain the speed is relatively simple and does not require particularly large computer resources.

The sleeve then advantageously comprises two coils and a tubular body in which two magnetic assemblies are mounted in opposition on the same axis, being separated by a spacer, and each comprising one of the coils and, remote from the spacer, one of the pole pieces so that the spacer, the coils, and the pole pieces form a housing for slidably receiving that portion of the moving member that presents the magnetic singularity.

This makes it possible to obtain relatively good linearity over the entire working stroke of the moving member, while retaining a sensor that is compact.

Also advantageously, the sleeve includes two permanent magnets, with each magnetic assembly including one of the two permanent magnets, each permanent magnet being mounted around the coil.

In a first embodiment of the magnetic singularity, the means for constituting the magnetic singularity comprises a ferromagnetic insert secured to a non-magnetic portion of the moving member.

This embodiment enables the sensor to have relatively good sensitivity.

In a second embodiment of the magnetic singularity, the means for constituting the magnetic singularity comprises a groove formed in a ferromagnetic portion of the moving member.

This embodiment is particularly simple.

Other characteristics and advantages of the invention appear on reading a description of a particular, non-limiting embodiment of the invention.

BRIEF DESCRIPTION OF THE DRAWINGS

Reference is made to the accompanying drawings, in which.

DETAILED DESCRIPTION OF THE INVENTION

Figure 1:
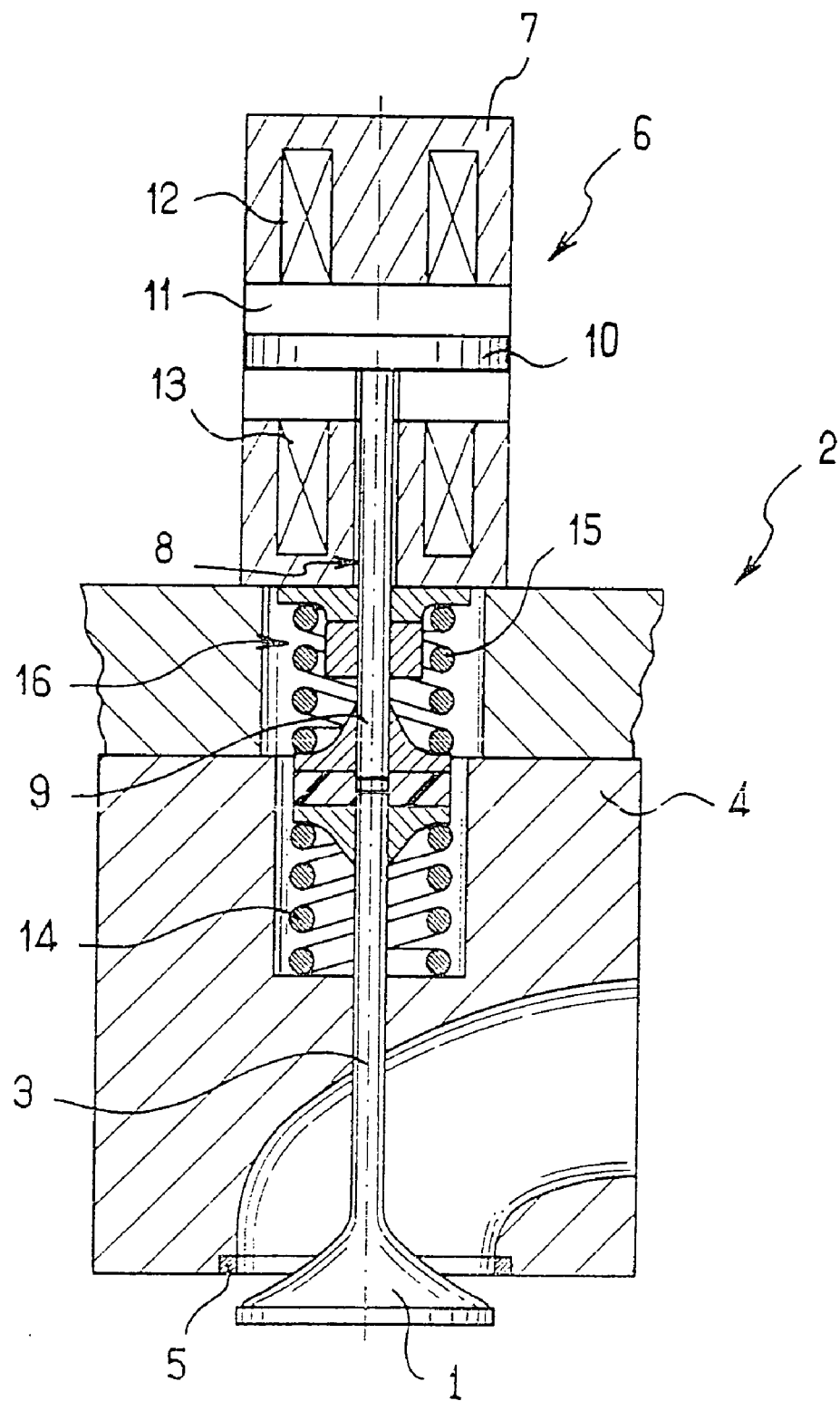
FIG. 1 is a fragmentary diagrammatic section view of a cylinder head of a four-stroke engine.

With reference to FIG. 1, the invention is described herein in its application to actuating a valve 1 in an engine having overall reference 2.

The valve 1 possesses a stem 3 which is mounted in the cylinder head 4 of the engine 2 to slide between a closed position in which the valve 1 is pressed against a seat 5 of the cylinder head 4, and an open position in which the valve 1 is separated from the seat 5 of the cylinder head 4.

The valve 1 is actuated between these two positions by means of an actuator given overall reference 6 and mounted on the cylinder head 4 of the engine 2.

The actuator 6 comprises a body 7 having a moving member slidably mounted therein that is given overall reference 8, the moving member comprising a rod 9 of non-magnetic material having a first end arranged to press against a free end of the stem 3 of the valve 1, and a second end secured to an armature 10 received in a housing 11 in the body 7 to slide parallel to the rod 9.

In known manner the body 7 incorporates electromagnetic means for moving the moving member 8. The electromagnetic means comprise an electromagnet 12 for holding the armature 10 in a first position corresponding to the valve 1 being in its closed position, and an electromagnet 13 for holding the armature 10 in a position corresponding to the valve 1 being in its open position. The electromagnets 12 and 13 open out to two opposite face of the housing 11 in the body 7 and they are controlled in known manner via means (not shown) relying on servo-control from a reference current and a travel speed of the moving member 8, and also on its positions. This form of servo-control which is known in itself is provided in this example by a dedicated unit commonly referred to as a valve control unit, which receives instructions to open and close the valve from the engine control unit. In a variant, the engine control unit can itself servo-control the electromagnetic actuator.

The actuator 6 further comprises, in conventional manner, resilient means for displacing the moving member 8. The resilient means comprise, in conventional manner, a first return spring 14 urging the valve 1 towards its closed position and the armature 10 towards its first position, and a second return spring 15 urging the armature 10 towards its second position.

A sensor given overall reference 16 is mounted on the cylinder head 4 or, as shown, on an element secured thereto such as the body 7 of the actuator 6. The sensor 16 forms a sleeve slidably receiving the rod 9 of the moving member 8.

Figure 2:
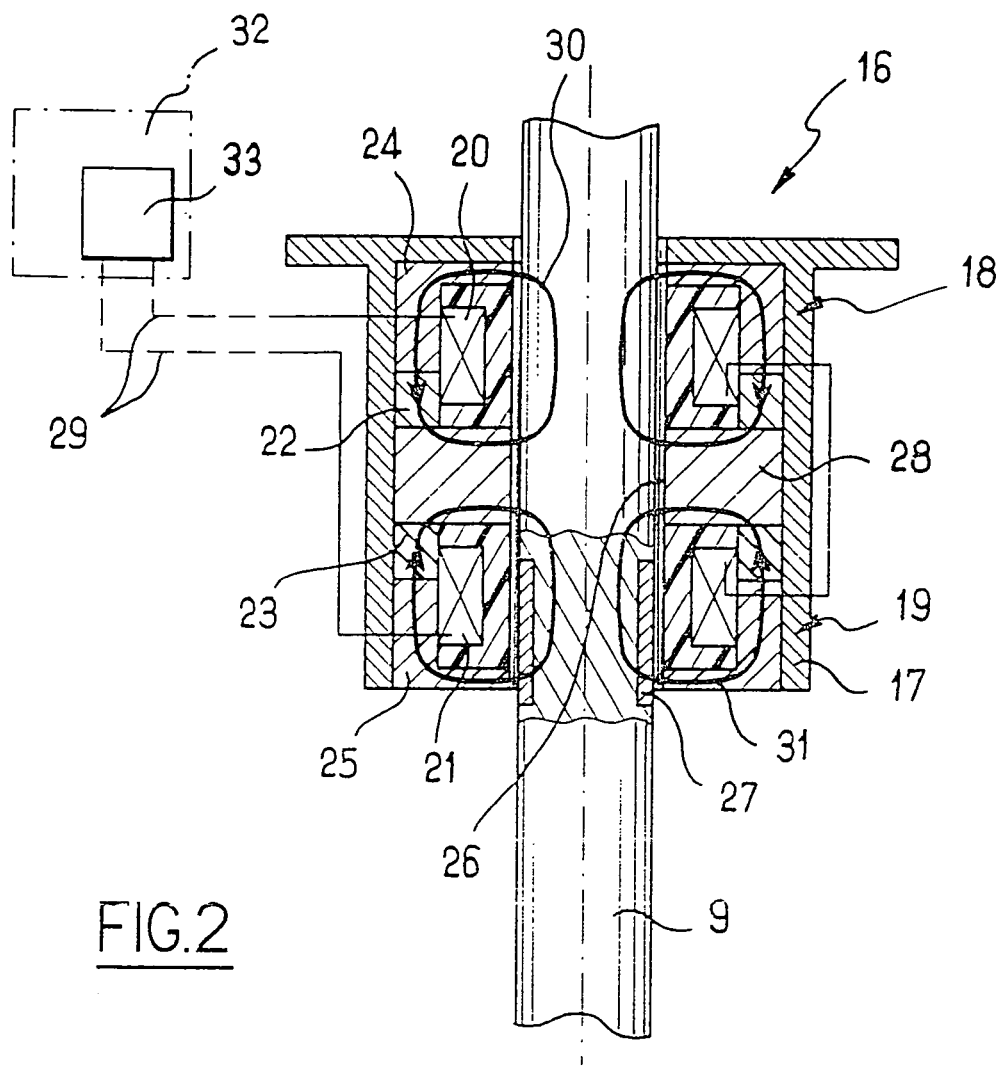
FIG. 2 is a fragmentary diagrammatic section view of the speed sensor used in this embodiment of the invention.

With reference to FIG. 2, the sensor 16 comprises a tubular body 17 of non-magnetic material that is provided with a base enabling it to be fixed to the body 7 of the actuator 6.

Two magnetic assemblies given overall references 18 and 19 are mounted symmetrically and on a common axis inside the tubular body 17 on either side of an annular spacer 28 of ferromagnetic material such as a mild steel.

Each magnetic assembly 18, 19 comprises an annular coil shown diagrammatically at 20, 21, an annular permanent magnet 22, 23 mounted coaxially around the coil 20, 21, and an annular pole piece 24, 25 disposed remote from the spacer 28.

The permanent magnets 22, 23 are disposed in such a manner as to produce opposing magnetic fields along the central axis of the sensor. These fields are represented by lines 30 and 31 in FIG. 2.

As shown in FIG. 2, the coils 20, 21 are electrically connected in series with each other so that one of the terminals of the coil 20 is connected to the terminal of opposite sign of the coil 21, with the remaining terminals of the coil 20 and of the coil 21 then being connected to the data acquisition module 33 of the valve control unit 32 by conductors 29. These terminals may also be connected to the data acquisition module of the engine control unit. The coils 20 and 21 are arranged and dimensioned (in particular in terms of number of winding turns, wire diameter, . . . ) in particular to provide resolution and a signal-to-noise ratio that are satisfactory for subsequent use of the signal. By way of example, for a speed resolution of 0.05 meters per second (m.s$^{-1}$) the coils are arranged to deliver a voltage of 5 volts (V) per m.s$^{-1}$.

The magnetic assemblies 18 and 19 are thus mounted in opposition.

The spacer 28, the coils 20, 21, and the pole pieces 24, 25 form a housing 26 for slidably receiving the rod 9 of the moving member 8.

A ferromagnetic insert 27, in this case a ring of ferromagnetic material, is mounted on the rod 9 of the moving member 8. The ferromagnetic insert 27 constitutes a magnetic singularity, i.e. a local modification in a magnetic characteristic of the rod 9 of the moving member.

The ferromagnetic insert 27, the coils 20, 21, and the permanent magnets 22, 23 are arranged so that the coils 20, 21 deliver a signal that is linear and independent of the position of the moving member 8. In other words, the ferromagnetic insert 27, the coils 20, 21, and the permanent magnets 22, 23 are arranged so that the rate of magnetic flux variation as a function of the speed of the moving member 8 is substantially constant regardless of the position of the moving member 8 (i.e. over the entire working stroke thereof) and so that the coils 20, 21 deliver a voltage that is proportional to the rate of magnetic flux variation (and thus to the speed of the moving member) with a ratio that is substantially constant over the entire working stroke of the moving member.

While the engine is in operation, the sliding movement of the moving member 8 causes the valve 1 to move between its open and closed positions. The ferromagnetic insert 27 secured to the rod 9 of the moving member 8 disturbs the magnetic field from the permanent magnet 22, 23 that is located close by (or the magnetic fields from both magnets), such that travel of the ferromagnetic insert 27 leads to variations in the magnetic flux produced by the permanent magnets 22, 23.

This magnetic flux variation induces a voltage variation in the coils 20, 21 that is proportional to the travel speed of the ferromagnetic insert 27, and thus to the travel speed of the moving member 8. Given the way the coils are connected to each other, it is the difference between the voltage across the coil 20 and the voltage cross the coil 21 that is transferred to the acquisition module.

This voltage is measured periodically at a time interval that is determined by the data acquisition module, and it is subsequently used by the valve control unit in which it is converted (multiplied by a proportionality coefficient) so as to be usable as the speed of the moving member 8.

In order to improve linearity, it is possible to act on the axial dimensions of the coils 20, 21, of the pole pieces 22, 23, of the spacer 28, and of the ferromagnetic insert 27. By way of example, the axial dimensions of these elements may be as follows:

6.75 millimeters (mm) for the coils 20, 21;

1 mm for each end pole piece 22, 23;

4.5 mm for the spacer 28; and 7 mm for the ferromagnetic insert 27.

Positions for the moving member 8 are obtained from its travel speed.

To illustrate how such positions can be obtained, we consider a series of speed measurements performed at instants $t_n$ that are spaced apart by determined time intervals $\Delta t$ starting from a known position of the moving member 8, such as its first position or its second position.

For example, at instant $t_0$, the moving member 8 is in its first position, i.e. $x_0$, at which we know that its speed $v_0$ is zero.

At instant $t_1$, a measurement is taken of the speed $v_1$ of the moving member 8. The position $x_1$ of the moving member 8 at the instant $t_1$ is evaluated by adding to $x_0$ an estimate of the distance traveled by the moving member 8 during the time interval $\Delta t$, i.e. the product of the speed $v_1$ multiplied by the time interval $\Delta t$. This gives the formula:

$$x_1 = x_0 + v_1 * \Delta t$$

It is then possible, from the new known position $x_1$ and from the speed $v_2$ at instant $t_2$ to evaluate the position $x_2$ of the moving member 8 at instant $t_2$ by applying the formula:

$$x_2 = x_1 + v_2 * \Delta t$$

The following general formula is thus used:

$$x_{n+1} = x_n + v_{n+1} * (t_{n+1} - t_n)$$

which corresponds to integrating the speed as a function of time, and starting from a position $x_n$ that is known or that is estimated by calculation.

This method of evaluating position makes it possible to use a single sensor, and thus enables the speed of the moving member 8 to be measured accurately and from which it is possible by means of the method to calculate in relatively simple and reliable manner the positions of the moving member 8.

These speeds and positions are subsequently used by the engine control unit, in particular for controlling the electromagnetic means of the actuator 6.

Figure 3:
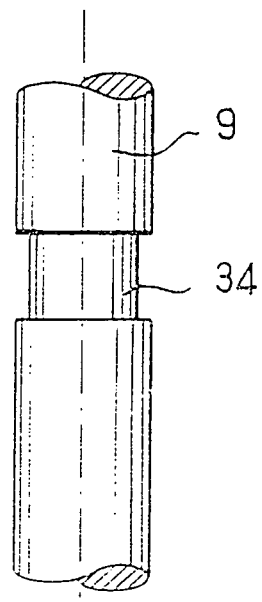
FIG. 3 is a fragmentary diagrammatic view showing a variant embodiment of the magnetic singularity.

In the variant of FIG. 3, the rod 9 of the moving member 8 is made of a ferromagnetic material and has an outside groove 34 that constitutes a magnetic singularity, i.e. a local change in a magnetic characteristic of the rod 9 of the moving member.

As in the preceding embodiment, the outside groove 34 disturbs the magnetic field from the permanent magnet 22, 23 near to which it is located (or the magnetic fields from both magnets) in such a manner that movement of the outside groove 34 leads to variations in the magnetic flux produced by the permanent magnets 22 and 23.

These magnetic flux variations induce voltage variations in the coils 20 and 21 proportional to the travel speed of the outside groove 34, and thus to the travel speed of the moving member 8.

Naturally, the invention is not limited to the embodiment described and variations can be applied thereto without going beyond the ambit of the invention as described by the claims.

In particular, the sensor can also be used with electromagnetic actuators that have only one electromagnet, for example those that use a rocking armature.

In addition, although the sensor is described in its application to measuring the speed of a moving member of an electromagnetic valve actuator, the sensor can also be used for measuring the speed of the valve itself, or of an elongate moving member, or more generally of any moving member of any device whatsoever, and not only in the automotive field.

In addition, the axial dimensions of the components can be modified, for example to modify the sensitivity of the sensor or to comply with given space availability.

The moving member may comprise a ferromagnetic portion and a non-magnetic portion in order to constitute the magnetic singularity.

Although the sensor is described as having two permanent magnets, the sensor could have a single annular permanent magnet that is radially polarized and disposed around a spacer, two annular coils disposed on either side of the permanent magnet and the spacer, and annular pole pieces disposed at the sides of the coils remote from the permanent magnet. The sensor may also comprise a single annular permanent magnet that is axially polarized and disposed around an annular coil. It is possible to use several means for improving the linearity of measurement over the entire stroke of the moving member, for example by providing axial dimensions for the coil, the magnet, and the magnetic singularity relative to the stroke of the moving member in such a manner that the speed measurement is taken in a zone of the sensor where the rate of magnetic field variation as a function of speed and the response of the coil or of the coils is/are relatively constant, or by providing special shapes, in particular for the coil in order to avoid edge effects.

Other integration techniques may also be used for obtaining the positions of the moving member on the basis of the speed measurements provided by the sensor. Thus, for example, integration may be implemented by averaging speeds over the time interval under consideration and using the following formula:

$$x_{n+1} = x_n + ((v_{n+1} + v_n)/2) * (t_{n+1} - t_n)$$

The invention claimed is:

1. A speed sensor for a moving member, the sensor comprising means for constituting a magnetic singularity on a portion of the moving member, and a sleeve slidably receiving said portion and including annular coils and a tubular body having two magnetic assemblies mounted in opposition to each other on a common axis, which assemblies are separated by a ferromagnetic spacer, each having one of the coils and, on its side remote from the spacer, an annular pole piece in such a manner that the spacer, the coils, and the pole pieces form a housing for slidably receiving the portion of the moving member that presents the magnetic singularity, each magnetic assembly comprises an annular permanent magnet disposed on a common axis between the annular pole pieces and mounted around its coil, the magnetic singularity, the coils, and the permanent magnets being arranged so that the coils provide a linear signal that is independent of the position of the moving member.

2. A sensor according to claim 1, wherein the means for constituting the magnetic singularity comprise a ferromagnetic insert secured to a non-magnetic portion of the moving member.

3. A sensor according to claim 1, wherein the means for constituting the magnetic singularity comprise an outside groove made in a ferromagnetic portion of the moving member.

* * * * *